Sept. 20, 1949.  G. H. NORQUIST  2,482,121
NOTCHING MACHINE
Filed Oct. 3, 1944  3 Sheets-Sheet 1
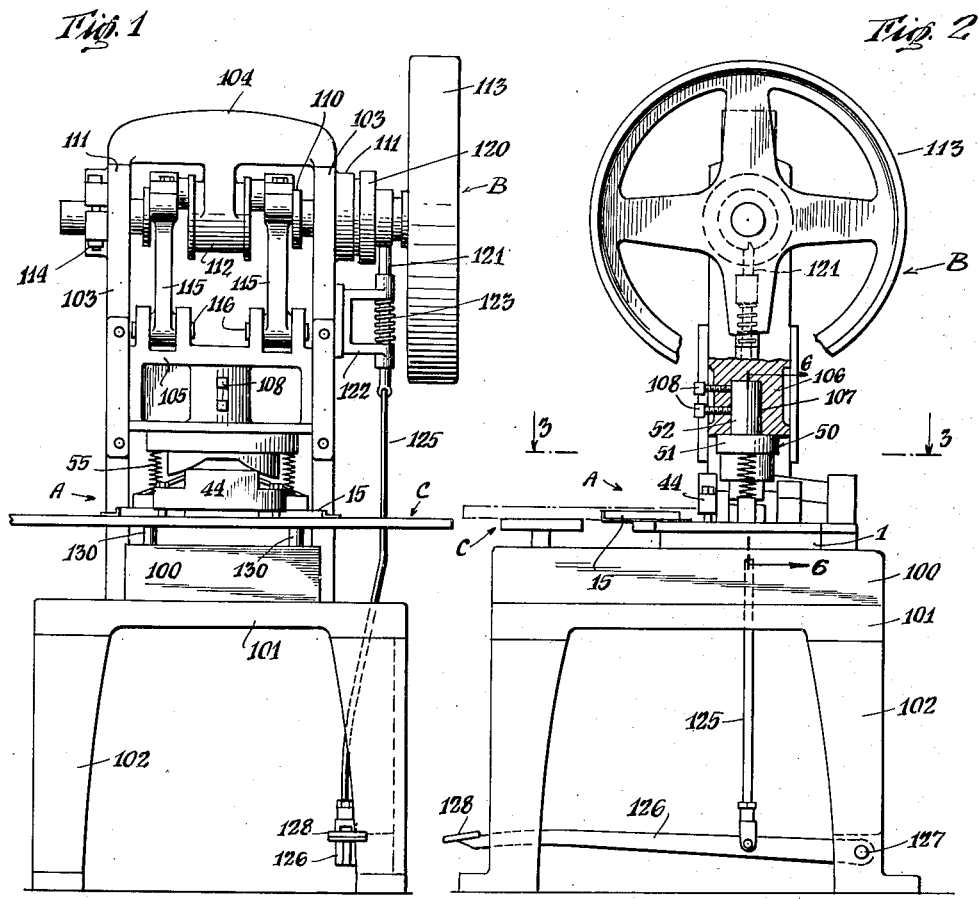
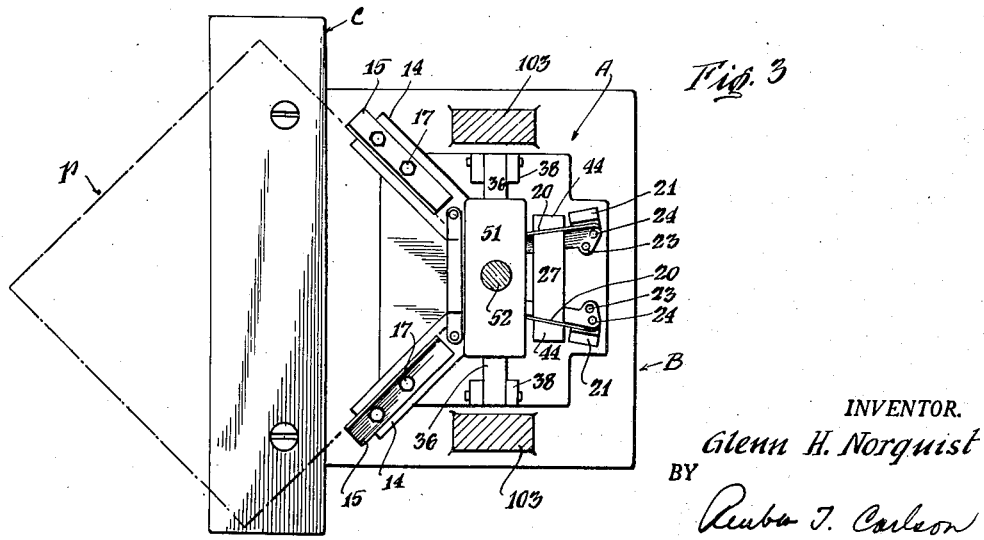
INVENTOR.
Glenn H. Norquist
BY
Reuben T. Carlson
ATTORNEY Sept. 20, 1949.  G. H. NORQUIST  2,482,121
NOTCHING MACHINE
Filed Oct. 3, 1944  3 Sheets-Sheet 2
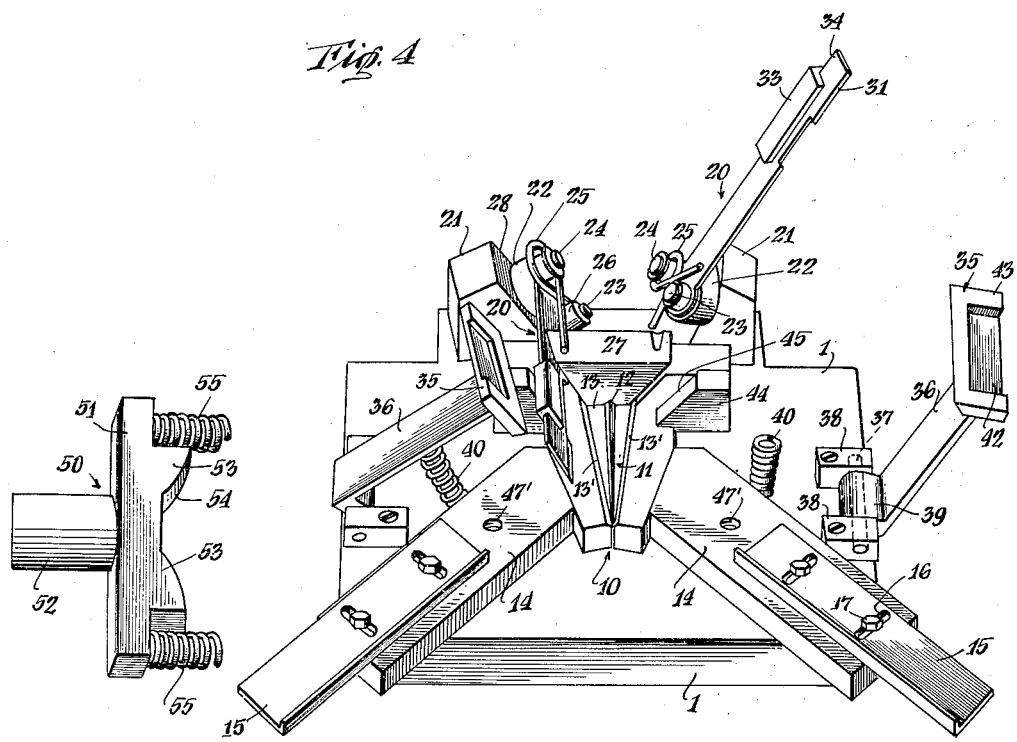
INVENTOR.
Glenn H. Norquist
BY
Reuben J. Carlson
ATTORNEY Sept. 20, 1949.    G. H. NORQUIST    2,482,121
NOTCHING MACHINE
Filed Oct. 3, 1944    3 Sheets-Sheet 3

INVENTOR.
Glenn H. Norquist
BY
Reuben J. Carlson
ATTORNEY

Patented Sept. 20, 1949

2,482,121

UNITED STATES PATENT OFFICE 2,482,121

NOTCHING MACHINE

Glenn H. Norquist, Jamestown, N. Y.

Application October 3, 1944, Serial No. 557,021

19 Claims. (Cl. 29—1)

This invention relates to notching machines, and more particularly to an improved machine for notching and crimping metal clad panels.

Metal clad panels comprising a base sheet formed of wood, plywood, fiberboard or other base material having a metal sheet secured to one side thereof possess qualities which make them highly adapted and useful for fabrication into table tops, shelving, cabinets, counters, packing cases and like products. In the fabrication of such metal clad panels, it is often necessary to form flanges along two or more sides of the panel. In flanging the panel it is customary to cut grooves in the base sheet, and then to notch out the corner of the panel so as to permit the flanges to be formed by bending the sheet metal along a line coincident with a groove formed in the base sheet so that the flanges will possess the desired contour. The corner notch has heretofore been cut completely through both the base sheet and the metal sheet so as to provide the panel with flanges having free ends meeting substantially in abutment. The adjacent ends of the metal flanges are then welded or soldered together. These corner forming operations are tedious and time consuming to perform, and the corner construction is relatively weak since the ends of the flanges are held together solely by the strength of the weld or solder seam.

In accordance with this invention, a machine is provided which cuts and forms the V-notch in the base sheet only, leaving the corner metal uncut and unweakened. The machine is also provided with means for crimping the corner metal so that the corner metal can be formed into a double ply reenforcing rib, which extends between the flange ends of the base sheet. The double ply metal corner rib may be seam welded to form an integral and rigid double ply metal rib which provides a sturdy corner reenforcing for the flanged panel which greatly increases the corner strength of the flanged panel where the strain in service is most severe.

The automatic cutting and crimping machine constructed in accordance with this invention comprises a die member supported upon an operating platform or table upon which the metal clad fiberboard is placed. The die has a crimping face for crimping the corner area of the metal sheet placed thereover. A pair of cutting or chopping knives, held in position by suitable guideways, are pivotally mounted so that they can be brought into cutting position over the corner of the fiberboard sheet. A pressure block is positioned over the cutting knives on which pressure may be exerted by a mechanical press which may be manually or power operated. Thus the pressure block may be given a predetermined downward stroke which drives the cutting knives into the base sheet to notch out the base sheet. The cutting knives may be arranged at any desired angle to define the shape of the cut out, for example, the cutting knives are preferably mounted at a predetermined tilt or angle so as to cut the ends of the defined flanges of the base sheet on a bias so that the ends of the flange formations of the base sheet will substantially abut when the panel flanges are brought into their final flanged position.

A suitable operating table or rack may be associated with the machine for supporting the workpieces to be operated upon, the table having suitable adjustable guides to retain the panel workpiece in proper operating position. The pressure block may be so formed as to permit attachment thereof to the reciprocating member of a manually or mechanically operated press so as to permit the cutting and crimping operation to be performed by relatively unskilled labor at high production speeds.

An object of this invention is to provide an improved machine for cutting and crimping metal clad panels with precision and accuracy, with minimum of labor and at low cost.

Another object of this invention is to provide an improved automatic cutting and crimping machine adapted to operate upon metal clad panels and remove V-shaped sections from the base sheet and substantially simultaneously crimp the metal section adjacent the cutout base sheet section.

A further object of this invention is to provide an improved machine for cutting and crimping metal clad panels, which is strong and sturdy in construction, simple and foolproof in operation, and which is adapted to perform a variety of cutting and crimping operations accurately and at relatively high production speeds.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. 1 is a front elevational view of the improved cutting and crimping machine shown in association with a power driven press for operating the same and a feed table for supporting the work-piece operated upon;

Fig. 2 is a side elevational view of the machine and the associated press and feed table, certain parts being broken away to illustrate certain operating details thereof;

Fig. 3 is a horizontal cross sectional view taken through the press along line 3—3 of Fig. 2; showing the automatic cutting and crimping machine and supporting table in top elevation;

Fig. 4 is a perspective view of the cutting and crimping machine with certain operating parts thereof exploded from the main part of the machine and other parts swung into a position to reveal structural features thereof in more detail;

Fig. 7 is a fragmentary perspective view of a metal clad panel prior to cutting and crimping; and Fig. 8 is a fragmentary perspective view of a metal clad panel after the corner cutting and crimping operation has been performed by the machine.

Similar reference characters refer to similar parts throughout the several views of the drawings and specification.

Figure 6:
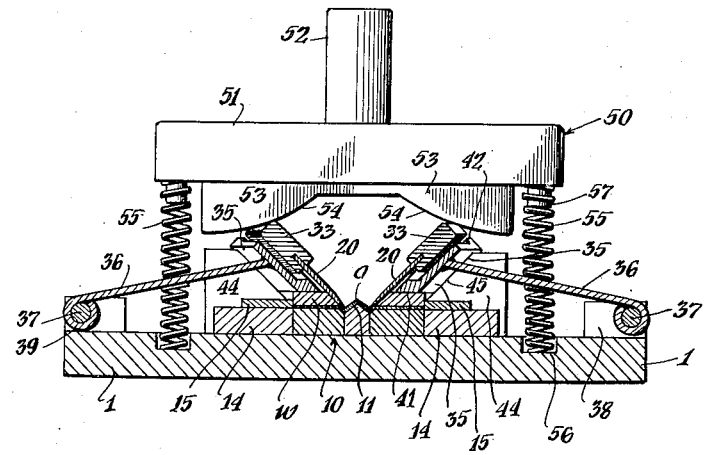
Fig. 6 is a cross sectional view of the machine as it appears when viewed along line 6—6 of Fig. 2.

Referring more particularly to Figs. 1, 2 and 3, the automatic cutting and crimping machine A may be associated with a suitable mechanical press B for applying the working pressure on the cutting knives, and an associated feed table C for supporting the panel to be operated upon.

There is illustrated in Fig. 7 a fragmentary portion of one form of metal clad panel $p$, which may be operated upon by the machine, which panel comprises a base sheet $w$ of such material as wood, plywood, or fiberboard, to which is firmly bonded a metal sheet $m$. The panel here shown is provided with grooves $g$ which have been cut into the base sheet $w$, and which meet or intersect adjacent the corner of the panel, so as to divide the panel into a center section $c$ and flange sections $d$.

The machine is so designed so as to remove a V-shaped corner section from the base sheet as shown in Fig. 8, so as to provide the flange sections $d$ thereof with mitered ends $d'$, leaving exposed a corner section $m'$ of the metal facing sheet. The metal corner section $m'$ is crimped by the machine so as to provide a raised ridge $o$ extending between the ends $d'$ of the fiberboard flange sections $d$. In a subsequent operation, not performed on this machine, the flange sections $d$ may be turned or bent into flange forming position, so that the adjacent ends $d'$ of the base sheet are substantially in abutment. The metal corner section $m'$ is further shaped into a reenforcing rib which extends between the ends $d'$ of the base sheet and adds substantial corner strength and rigidity to the flanged panel.

The operating mechanism of the cutting and crimping machine A is supported upon a heavy base plate 1 which may rest upon the bed plate 100 of the press B. The bed plate 100 of the press may rest upon a table framework 101 supported upon staunch legs 102 resting on the factory floor. The press comprises mechanism positioned above the base plate 1 for reciprocating a pressure block 50 forming a part of the cutting and crimping machine, the details of which will be more fully hereinafter described.

Figure 5:
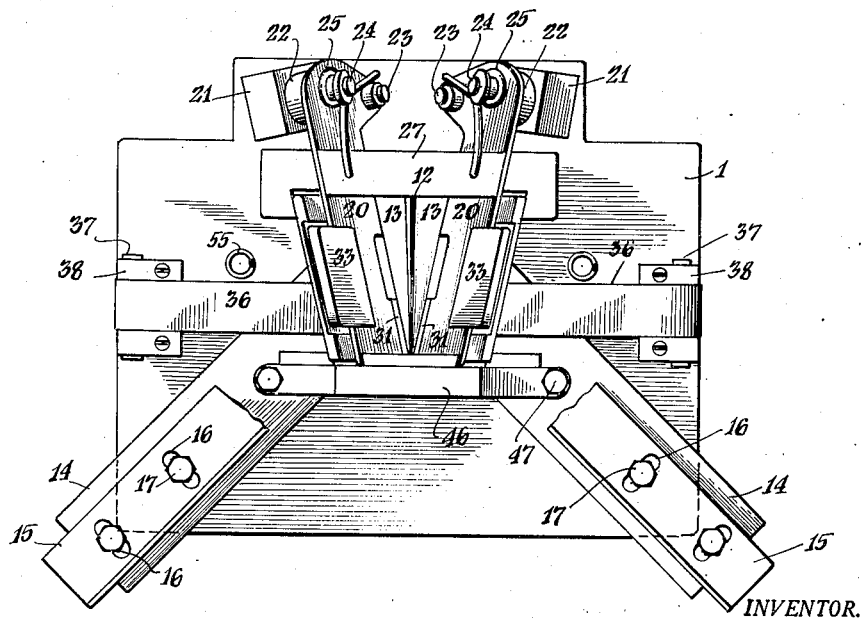
Fig. 5 is a top elevational view of the operating parts of the cutting and crimping machine in operating position but with the pressure block removed.

The cutting and crimping machine comprises a die block 10 which is supported upon the base plate 1, and a pair of cutting blades 20 designed to cut a V-shaped notch in the base sheet $w$ of the panel. The die block 10, as shown more particularly in Figs. 4, 5 and 6, is preferably formed of tool steel and is provided with a V-shaped ridge 11 in the upper face thereof, which conforms in shape to the ridge $o$ to be formed in the corner metal $m'$ of the panel workpiece $p$. The V-shaped ridge 11 of the die block 10 is bisected by a raised ridge line 12 and sloping side faces 13 which terminate in a slight groove 13' which give definition to the sides of the V-shaped crimp to be formed in the corner metal. A pair of flat supporting bars 14 which rest upon and are secured to the base plate 1 and extend at an angle to the die block 10, provide a support for the metal clad panel being operated upon. It will be noted that the top surface of the supporting bars 14 are flush with the top surface of the die block 10 so that the metal face of the metal clad panel may rest smoothly thereon. A guide strip 15 is adjustably secured to each of the supporting bars 14 by means of stud bolts 16 extending through transverse slots in the guide strip. The guide strips 15 serve to retain the metal clad panel being operated on in fixed position therebetween.

A pair of cutting knives 20 which operate to notch out the base sheet are each pivotally supported on a pivot block 21 fixed to the base plate 1. Each cutting knife 20 is directly supported on a boss element 22, a hinge bolt 23 extends through the end of the cutting knife and the boss element 20 and is secured to the pivot block 21. A stud 24 projects laterally from each cutting knife 20 at a point adjacent the hinge bolt 23. A steel spring 25 is attached to the stud 24, one end of the spring 25 being arranged to abut a sleeve 26 which surrounds the hinge bolt 23 and the other end being designed to rest upon a vertical wall block 27, as shown more particularly in Fig. 4. The steel spring 25 operates to normally swing the cutting knife 20 into substantially vertical inoperative position as shown at the right hand side of Fig. 4 so that pressure must be exerted on the cutting knife to maintain the same in cutting position as shown on the left-hand side of Fig. 4. It will be noted that each cutting knife 20 is inclined so that its cutting edge 31 when in operative position will align with the groove 13' in the die block, as shown more particularly in Fig. 6. It will be appreciated that the pivot face 28 of each pivot block 21 and the corresponding face of the boss portion 22 are so shaped and inclined as to guide the cutting edge 31 of each knife into alignment with the groove 13' in the die block 10. As shown more particularly in Fig. 4, each knife 20 is provided with a steel saddle 33 attached to the back edge thereof against which substantial downward pressure may be applied to force the cutting edge 31 of the knife into and through the base sheet. To brace each knife 20 in its proper inclined position during the cutting operation, a guide block 35 is provided, affixed to one end of an arm 36 whose other end is pivotally mounted on a hinge pin 37 whose ends are supported in bearing blocks 38 affixed to the base plate 1. The hinge pin 37 extends through a sleeve 39 integrally formed on the end of the arm 36. A coil spring 40, one end of which rests upon and is secured to the base plate 1, has the upper end thereof arranged to bear against and support the arm 36 in raised inoperative position as shown at the left hand side of Fig. 4. The arm 36 shown at the right hand side of Fig. 4 has been swung completely off from the coil spring 40 to illustrate further details of the construction.

When the guide block 35 is in operative position, as shown more particularly in Fig. 6, the lower end 41 thereof will rest against the top surface of the base sheet $w$ of the metal clad panel being operated upon. The lower edge 41 of the guide block 35 is preferably beveled as shown in Fig. 6 so as to smoothly seat on the base sheet $w$. The inside face of the guide block 35 may be notched out as at 42 to provide a pocket which receives the saddle 33 attached to the cutting blade 20, the raised faces 43 of the guide block 35 providing a smooth seat for the adjacent faces of the cutting blade 20. The guide blocks 35 are held in operative position as shown in Figs. 5 and 6 by the pressure block 50 shown in Fig. 6. To further hold each blade guide block 35 in proper inclined operative position, an abutment block 44 is provided which is attached to the base plate 1 and which is provided with an inclined face 45 against which the back side of the guide block 35 is adapted to seat, thereby supporting guide block 35 and the cutting blade 20 in proper inclined position.

To prevent the free ends 34 of the cutting blades from spreading apart, a strut member 46 formed of heavy steel extends transversely between the panel supporting bars 14 and is secured thereto by bolts 47 extending into threaded holes 47' in the bars 14. The inner face of the strut 46 has attached thereto a pair of spaced side blocks 48, having a central wedge shaped block 49 positioned between the side blocks 48. The side blocks 48 and the intermediate wedge block 49 define therebetween a pair of inclined grooves 49' in which the free ends 34 of the cutting blades 30 are adapted to move. Thus the grooves 49' maintain the ends 34 of the cutting knives 20 in proper inclined position and further assist the guide blocks 35 in supporting and maintaining the cutting knives 20 in proper inclined position.

Downward cutting pressure is exerted upon the cutting blades 20 by means of the pressure block 50 which comprises a heavy block member 51 having an attaching stud 52 projecting upwardly therefrom. The under surface of the block member 51 is provided with a pair of downwardly projecting cam elements 53 each having a cam surface 54 adapted to rest upon and bear against the saddles 33 attached to the cutting blades 20. The cam surfaces 54 are so shaped as to exert a combined downward and laterally inclined pressure on the blade saddles 33 and associated cutting blades 30, as illustrated more particularly in Fig. 6. Thus when downward pressure is applied to the block member 51, the blade saddles 33 will slide transversely across the cam surface 54 so as to exert a lateral downward pressure on the cutting blades 30 so that the ends $d'$ of the flanges $d$ of the base sheet $w$ are cut on a bias. The cutting blades 30 are so pivoted and arranged that a V-shaped section of desired shape is cut from the corner of the base sheet. A pair of coil compression springs 55 may be provided to normally lift and retain the pressure member 51 in raised inoperative position, each compression spring 55 having the lower end thereof seating within a suitable socket 56 provided in the base plate 1, and the upper end thereof being attached to a stud 57 projecting downwardly from the pressure member 51. Thus when no load or downward pressure is exerted upon the pressure member 51, the coil springs 55 will maintain the pressure member 51 in raised position so that the cutting edges 31 of the cutting blades 30 may be raised above the metal clad panel being operated upon, thus permitting successive removal and reinsertion of the metal clad panels into the machine. It will be appreciated that the steel springs 25 associated with the cutting knives 20 exert a lifting force thereon when the downward pressure exerted on the blade saddles 30 is removed, the steel springs 25 at all times retaining the blade saddles 30 in contact with the cam surfaces 54 of the pressure member 51. It will be further noted that the guide blocks 35 are at all times under the lifting influence of the compression springs 40 so that the lower ends 41 of the guide blocks 35 will rise away from the work piece panel $p$ along with the rising movement of the cutting blades 20. Since the saddle 33 of each blade 20 is snugly pocketed within the recess 42 of the adjacent guide block 35, the guide block 35 will follow the reciprocating movement of the associated cutting blade 20 and the saddle 33 will carry the guide block 35 downward into seating contact with the base sheet $w$ of the panel workpiece $p$ when pressure is applied to the blade saddle 33 by the pressure block 50.

The pressure block 50 may be given the desired reciprocating movement by any desired mechanical means such as the mechanical press B illustrated in Figs. 1, 2 and 3. The mechanical press here shown comprises a pair of spaced upright standards 103 which rest upon the table frame 101, the standards being connected at their upper end by a yoke frame 104. A slide frame 105 is arranged to reciprocate between the standards 103. The slide frame 105 has a collar 106 formed therewith, having an interior socket 107 into which the stud 52 of the pressure block may be inserted. Suitable set screws 108 or other devices may be provided to retain the stud 52 in the socket 107. The pressure member 51 may seat against the lower face of the slide frame 105 so as to transmit the downward force exerted by the slide frame 105 directly against the pressure member 51.

The slide frame may be reciprocated by any desired mechanism. As shown in Figs. 1 and 2 for purposes of illustration, power means for reciprocating the slide frame 105 may comprise a crank shaft 110 journaled in bearings 111, associated with the supporting standards 103, and a center bearing 112 supported from the yoke frame 104. One end of the crank shaft 110 may be provided with a balancing flywheel pulley 113 around which a drive belt may be turned, and the other end provided with a friction brake 114. A pair of pistons 115 are attached at one end thereof to the crank shaft 110 and at the other end thereof to the slide frame 105 by means of hinge pins 116.

The metal clad panel to be operated upon may be additionally supported on any suitable table. There is illustrated in Figs. 1, 2 and 3 a table plate C whose upper surface may be in the same horizontal plane as the top surface of the panel supporting bars 14 of the cutting and crimping machine. Table C may be supported at the desired elevation by means of studs 130 which project upwardly from the bed plate 100 of the press B and held in place by screws 131. Thus the metal clad panel to be operated upon may rest on the table C and the supporting bars 14, the side edges of the panel being pushed against the guide strips 15 which have been so adjusted as to insure that the corner of the panel has been placed in proper operative position upon the die block 10.

It is important that the reciprocating movement of the pressure block 50 be under the immediate control of the operator. A clutch 120 operatively connects the continuously rotating drive wheel 113 to the crankshaft 110. The clutch 120 is engaged by a control bolt 121 supported by a bracket 122 attached to the adjacent supporting standard 103 of the press. The end of the control bolt 121 is normally held in engagement with the clutch 120 by means of a compression spring 123. When the control bolt 121 is in engagement with the clutch 120, the crankshaft 110 does not rotate, and when the control bolt 121 is withdrawn from engagement with the clutch 120 the crankshaft 110 will make one complete revolution and reciprocate the slide frame 102 one complete stroke. The friction brake 114 is adjusted to prevent further rotation of the crankshaft 110 when disengaged by the clutch 120 from the drive wheel 113. The lower end of the control bolt 121 is connected to a control rod 125 connected to a foot lever 126, one end of which is pivotally mounted as by pin 127 to the adjacent leg of the press. A foot pad 128 is attached to the other end of the foot lever 126 and is conveniently arranged so that the foot lever 126 may be depressed by the foot of the operator to withdraw the control bolt 121 from engagement with the clutch 120.

To notch and crimp the metal clad panel shown in Fig. 8, the operator places the panel upon the table C and the supporting bars 14, pushing the adjacent side edges of the panel against the previously adjusted guide strips 15. The corner of the panel to be operated on should then be properly positioned upon the die block 10. At this point the slide frame 105 of the press B is in its full raised position and the pressure member 51 of the pressure block 50 is held in raised position by the coil springs 55. The cutting knives 20 will also be held in raised position so that the cutting edges 31 thereof are out of contact with the panel to be operated upon, the knives 20 being held in raised position by the steel springs 25. The knives 20 in this raised position, however, will have the saddles 33 mounted thereon in contact with the cam surfaces 54 of the cams 53 forming a part of the pressure block 50.

When the panel has been placed in proper operative position beneath the cutting blades 20 and properly resting upon the die block 10, the operator steps on the foot pad 128 of the foot lever 126, thereby withdrawing the control bolt 121 from engagement with the clutch 120. The drive wheel 113 then will rotate the cam shaft 110 one complete revolution, the operator removing his foot from the foot pad 128 so that the control bolt 121 will manipulate the clutch 120 so as to disengage the drive wheel 113 from the cam shaft 110 when the cam shaft 110 has made one complete revolution. It will be noted that the friction brake 114 also serves to immediately halt rotation when the clutch 120 disengages the cam shaft 110 from the drive wheel 113.

During the initial 180 degree rotation of the cam shaft 110, the pistons 115 attached thereto move the slide frame 105 of the press downwardly, the pressure member 51 of the pressure block 50 moving downwardly therewith against the action of the compression springs 55. As the pressure member 51 moves downwardly, downward pressure is exerted on the saddles 33 attached to the cutting knives 20, driving the cutting edges 31 on the cutting knives 20 through the base sheet $w$ of the panel to form the desired V-shaped notch cut-out therein. Downward movement of the cutting knives 20 also exerts pressure on the bracing or guiding blocks 35 so that the beveled ends 41 thereof seat against the top surface of the panel. The downward pressure exerted by the cutting knives 20 on the panel also forces the metal corner section into conformity with the shape of the V-shaped ridge 11 in the die block 10. The metal corner is thus crimped and shaped as illustrated in Figs. 6 and 8.

As the cam shaft continues its complete revolution the slide frame 105 is raised, permitting the pressure member 51 to rise under the influence of the coil springs 55. With the rising movement of the pressure member 51, the downward pressure exerted on the cutting knives 20 is also released, permitting the steel springs 25 to raise the knives 20 out of contact with the panel operated upon. Thus it will be appreciated that the panel is both notched and crimped by a single stroke of the slide frame 105 of the press B, and the entire operation is completed in a matter of a few seconds. By the use of the machine as herein described metal clad panels can be notched and crimped with precision and accuracy at high production speed by a relatively untrained operator. Metal clad panels to be operated upon may be moved into position under the cutting knives, the operation performed thereon and the panels removed in rapid succession. The base plate 1 of the cutting and crimping machine is placed upon the base block 100 of the press at the correct elevation so that the downward stroke of the press causes the cutting blades 20 to completely cut through the base sheet without damage or injury to the metal facing sheet of the panel.

By the use of a die block having ridge formations of desired shape, and by arranging the cutting knives 20 at the desired angle, V-shaped notches may be cut in the base sheet and crimps formed in the metal sheet of any desired shape or contour best suited to the finished work to be performed. By the use of this improved cutting and crimping machine metal clad panels may be prepared for flanging in a manner to greatly simplify the flanging operation later to be performed, insuring a flanged panel having extremely strong corners with the flanges extending accurately at the desired angle.

While certain novel features of the invention have been disclosed herein, and are pointed out in the annexed claims, it will be understood that various omissions, substitutions and changes may be made by those skilled in the art without departing from the spirit of the invention.

What is claimed is:

1. A machine for notching panels including in combination, a support for the panel, a pair of hinged cutting elements movable into cutting position over the panel, a pressure block having a pressure face positioned adjacent the cutting edge of each of said cutting elements adapted to be pressed against the panel during the cutting operation, and pressure means for applying pressure to said cutting elements to drive the cutting edges thereof into the panel and simultaneously press the pressure face of said pressure blocks firmly against the panel.

2. A machine for notching panels including in combination, a support for the panel, a pair of hinged cutting knives movable into cutting position over the panel, resilient means for normally retaining said cutting knives out of contact with the panel, a pair of pressure blocks having pressure faces adjacent the cutting edges of said cutting knives adapted to be pressed against the panel, and pressure means for applying pressure to said hinged knives to drive the cutting edges thereof into the panel and simultaneously press the pressure face of said pressure blocks firmly against the panel.

3. A machine for notching panels including in combination, a support for the panel, a pair of hinged cutting knives, means for guiding the hinging movement of said knives at an inclined angle with respect to the panel, a pair of pressure blocks having pressure faces adjacent the cutting edges of said cutting knives adapted to be pressed against the panel, and pressure means for applying pressure to said hinged knives to drive the cutting edges thereof into the panel and simultaneously press the pressure face of said pressure blocks firmly against the panel.

4. A machine for notching and crimping metal clad panels of the type comprising a metal sheet secured to a base sheet, said machine including in combination, a die block having a preformed die face upon which the metal face of the panel may be supported, a pair of hinged cutting knives movable into position over the base sheet of the panel supported upon said die block, guide elements adapted to rest on the base sheet and guide the cutting movement of said knives, and a reciprocable pressure device operative to exert downward pressure on said knives to cut the base sheet and press the adjacent section of the metal sheet into shaping contact with the die face of said die block.

5. A machine for notching and crimping metal clad panels of the type comprising a metal sheet secured to a base sheet, said machine including in combination, a die block having a preformed die face upon which the metal face of the panel may be supported, a pair of hinged cutting knives movable into position over the base sheet of the panel supported upon said die block, resilient means for normally retaining said cutting knives out of contact with the panel, guide blocks adapted to rest on the base sheet and guide the cutting movement of said knives at an inclined angle with respect to the panel, and a reciprocable pressure block operative to exert downward pressure on said knives to cut the base sheet and press the adjacent section of the metal sheet into shaping contact with the die face of said die block.

6. A machine for notching and crimping metal clad panels of the type comprising a metal sheet secured to a base sheet, said machine including in combination, a die block having a preformed die face upon which the metal face of the panel may be supported, a pair of resiliently hinged cutting knives movable into position over the base sheet of the panel supported upon said die block, a pair of resiliently hinged guide blocks adapted to rest on the base sheet and guide the cutting movement of said knives, and a reciprocable pressure block having cam surfaces operative to exert downwardly inclined pressure on said knives to cut the base sheet and press the adjacent section of the metal sheet into shaping contact with the die face of said die block.

7. A machine for notching and crimping metal clad panels of the type which comprises a metal sheet secured to a base sheet, said machine including in combination, a die block having a preformed die face for crimping a section of the metal sheet, a pair of hinged cutting knives movable into position over the base sheet adjacent said die face, guide blocks for guiding the hinging movement of said knives at an inclined angle with respect to the panel, a reciprocable pressure block having cam means operative to drive the cutting edges of said knives into the base sheet at an inclined angle and press the adjacent section of the metal sheet into shaping conformity with the die face of said die block.

8. A machine for notching and crimping metal clad panels of the type which comprises a metal sheet secured to a base sheet, said machine including in combination, a die block having a preformed die face for crimping a section of the metal sheet, means for supporting the panel in operative position, hingedly mounted cutting knives movable into position over the base sheet adjacent said die face, hingedly mounted guide blocks for guiding the hinging movement of said knives at an inclined angle with respect to the panel, spring elements for resiliently supporting said knives and guide blocks in inoperative position, and a reciprocable pressure block having cam means operative to drive the cutting edges of said knives into the base sheet at an inclined angle and press the adjacent section of the metal sheet into shaping conformity with the die face of said die block.

9. A machine for notching and crimping metal clad panels of the type which comprise a metal sheet secured to a base sheet, said machine including in combination, a die block having a preformed die face for crimping a section of the metal sheet, means for supporting the panel in operative position, hingedly mounted cutting knives movable into position over the base sheet adjacent said die face, hingedly mounted guide blocks for guiding the hinging movement of said knives at an inclined angle with respect to the panel, spring elements for resiliently supporting said knives and guide blocks in inoperative position, a reciprocable pressure block having cam means operative to drive the cutting edges of said knives into the base sheet at an inclined angle and press the adjacent section of the metal sheet into shaping conformity with the die face of said die block, a mechanical press for reciprocating said pressure block, and means for controlling the stroke of said press.

10. A machine for notching panels including in combination, a support for the panel, a pair of cutting knives movable into cutting engagement with the panel, means to guide the cutting movement of said knives at an inclined angle to the face of the panel whereby the panel edges severed by the cutting edges of said knives will be inclined with respect to the face of the panel, a pressure block having a pressure face positioned adjacent the cutting edge of each of said cutting knives adapted to be pressed against the panel during the cutting operation, a pair of cam elements having inclined cam faces extending transversely of the plane of said knives, and means for exerting pressure on said cam elements to drive the cutting edges of said knives into the panel and simultaneously press the pressure face of said pressure blocks firmly against the panel.

11. A machine for notching panels including in combination, a support for the panel, a pair of cutting knives, means for mounting said cutting knives in a manner whereby the cutting edges thereof when in cutting position define a substantially triangular shaped area therebetween, means to guide the cutting movement of said knives at an inclined angle to the face of the panel whereby the panel edges severed by said knives will be inclined with respect to the face of the panel, a saddle fixed to each of said knives, a cam element for each of said knives having a cam face adapted to ride on said knife saddle, a pressure block having a pressure face positioned adjacent the cutting edge of each of said cutting knives adapted to be pressed against the panel during the cutting operation, and means for exerting pressure on said cam elements and said saddles to drive the cutting edges of said knives into the panel and simultaneously press the pressure face of said pressure blocks firmly against the panel.

12. A machine for cutting panels including in combination, a support for the panel, a cutting knife, means to guide the cutting movement of said knife at an inclined angle to the face of the panel whereby the panel edge severed by said knife will be inclined with respect to the face of the panel, a saddle fixed to said knife, a cam element having a cam face adapted to ride on said knife saddle, a pressure block having a pressure face positioned adjacent the cutting edge of said cutting knife adapted to be pressed against the panel during the cutting operation, and means for exerting pressure on said cam element and said saddle to drive the cutting edge of said knife into the panel and simultaneously press the pressure face of said pressure block firmly against the panel.

13. A machine for cutting panels including in combination, a support for the panel, a cutting knife, means to guide the cutting movement of said knife at an inclined angle to the face of the panel whereby the panel edge severed by said knife will be inclined with respect to the face of the panel, a pressure block having a pressure face positioned adjacent the cutting edge of said knife adapted to be pressed against the face of the panel during the cutting operation, and means for exerting pressure on said knife to drive the cutting edge thereof into the panel.

14. A machine for notching panels including in combination, a support for the panel, a pair of cutting knives, means for mounting said cutting knives in a manner whereby the cutting edges thereof when in cutting position define a substantially triangular shaped area therebetween, means to guide the cutting movement of said knives at an inclined angle to the face of the panel whereby the panel edges severed by said knives will be inclined with respect to the face of the panel, a pressure block having a pressure face adjacent to the exterior face of each of said knives adapted to be pressed against the panel during the cutting operation, and means for exerting pressure on said knives to drive the cutting edges thereof into the panel.

15. A machine for cutting V-shaped notches in panels including in combination, a pair of cutting knives having the cutting edges thereof arranged to define when in cutting position a triagular area therebetween, a pressure block having a pressure face positioned adjacent the cutting edge of each of said knives adapted to be pressed against the panel face during the cutting operation, resilient means normally retaining said pressure blocks and cutting knives out of contact with the panel, and means for exerting pressure on said cutting knives to drive the cutting edges thereof into the panel and simultaneously press said pressure blocks against the panel face.

16. A machine for making a beveled cut in panels including in combination, a reciprocable cutting knife having a cutting edge movable into cutting position over the panel, means for guiding the reciprocating movement of said knife along a straight-line, inclined angle with respect to the panel, a pressure block having a pressure face positioned adjacent the cutting edge of said knife adapted to be pressed against the panel face during the cutting operation, resilient means normally retaining said pressure block and cutting knife out of contact with the panel, and means for exerting pressure on said cutting knife to drive the cutting edge thereof into the panel and simultaneously press said pressure block against the panel face.

17. A machine for notching panels including in combination, a pair of cutting knives, stationary guide blocks having inclined faces adapted to support said knives in inclined position, a pressure block positioned adjacent the cutting edge of each of said knives, a saddle mounted on each of said knives, and a reciprocable pressure member having inclined cam faces adapted to ride on said saddles to drive the cutting edges of said knives into the panel and substantially simultaneously press said pressure blocks against the panel face.

18. A machine for notching panels including in combination, a pair of cutting knives, stationary guide blocks having inclined faces adapted to support said knives in inclined position, a pressure block positioned adjacent the cutting edge of each of said knives, resilient means for retaining said cutting knives and pressure blocks out of contact with the panel, a saddle mounted on each of said knives, and a reciprocable pressure member having inclined cam faces adapted to ride on said saddles and to drive the cutting edges of said knives into the panel and substantially simultaneously press said pressure blocks against the panel face.

19. A machine for cutting V-shaped notches in panels including in combination, a pair of cutting knives having the cutting edges thereof arranged to define when in cutting position a triangular area therebetween, a pressure block having a pressure face positioned adjacent the cutting edge of each of said knives adapted to be pressed against the panel face during the cutting operation, resilient means normally retaining said pressure blocks and cutting knives out of contact with the panel, a saddle member mounted on each of said knives, and a reciprocable pressure member having inclined cam faces adapted to ride on said saddles and to drive the cutting edges of said knives into the panel and substantially simultaneously press said pressure blocks against the panel face.

GLENN H. NORQUIST.

REFERENCES CITED

The following references are of record in the file of this patent:

UNITED STATES PATENTS

| Number | Name | Date |
| --- | --- | --- |
| 231,209 | Brooks et al. | Aug. 17, 1880 |
| 524,726 | McHugh | Aug. 21, 1894 |
| 936,673 | Shuman | Oct. 12, 1909 |
| 1,567,078 | Pennington | Dec. 29, 1925 |
| 1,725,584 | Humphris | Aug. 20, 1929 |
| 1,812,046 | Groehn | June 30, 1931 |
| 2,120,902 | Moore | June 14, 1938 |
| 2,193,018 | Batcheller | Mar. 12, 1940 |
| 2,274,765 | Zalkind | Mar. 3, 1942 |
| 2,342,835 | Bray | Feb. 29, 1944 |
| 2,348,875 | Beard | May 16, 1944 |

FOREIGN PATENTS

| Number | Country | Date |
| --- | --- | --- |
| 223,815 | Great Britain | Oct. 30, 1924 |